Feb. 25, 1941.          A. L. McHUGH          2,233,268
PUMPING MECHANISM
Filed March 24, 1939

INVENTOR
Anthony L. McHugh
BY
HIS ATTORNEY

Patented Feb. 25, 1941

2,233,268

UNITED STATES PATENT OFFICE 2,233,268

PUMPING MECHANISM

Anthony L. McHugh, Easton, Pa., assignor to Ingersoll-Rand Company, Jersey City, N. J., a corporation of New Jersey Application March 24, 1939, Serial No. 263,847

5 Claims. (Cl. 103—111)

This invention relates to pumping mechanisms, and more particularly to a pump of the centrifugal type in which the impeller and the shaft carrying it are in telescopic engagement with each other.

One object of the invention is to facilitate the operation of removing the impeller from the shaft.

Another object of the invention is to enable the utilization of constituent parts of the pump for effecting the removal of the impeller from the shaft.

Other objects will be in part obvious and in part pointed out hereinafter.

Figure 1:
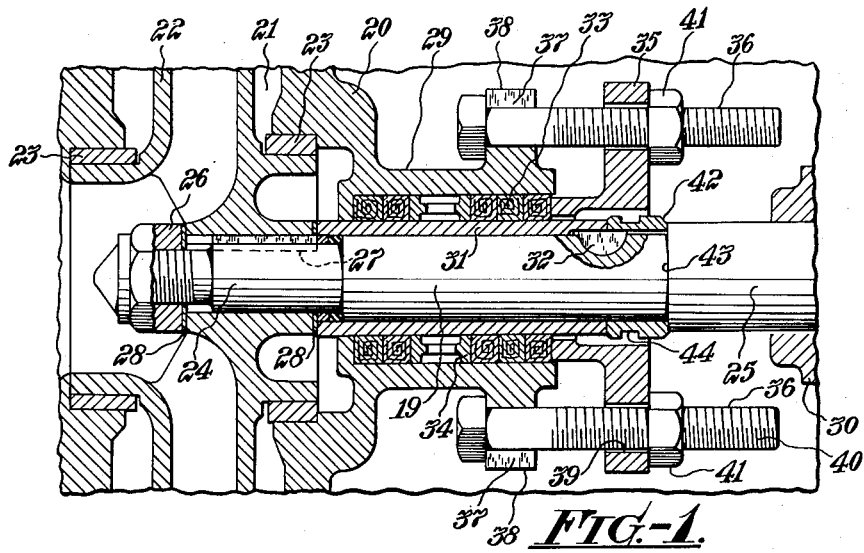
Figure 2:
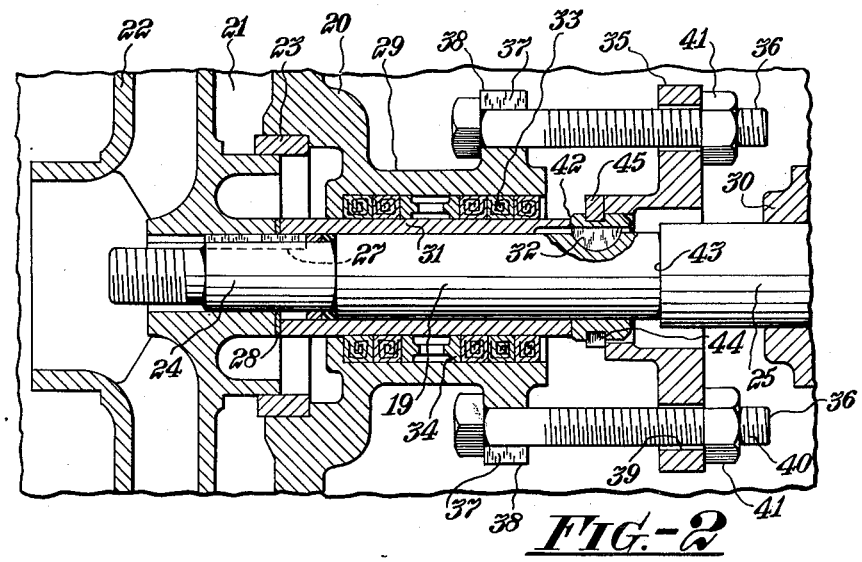
Figure 3:
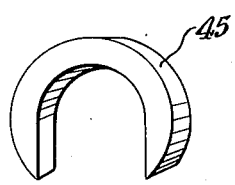

In the drawing accompanying this specification and in which similar reference numerals refer to similar parts, Figure 1 is a longitudinal elevation, in section, of a portion of a centrifugal pump showing the position which the parts normally occupy, Figure 2 is a similar view illustrating the positions of the parts during the removal of the impeller from the shaft, and Figure 3 is a perspective view of a detail.

Referring more particularly to the drawing, the pump, of which only so much is shown as will serve to illustrate a practical application of the invention, comprises a casing 20 having a pumping chamber 21 to accommodate an impeller 22 which carries the usual wearing rings 23 on its hub portion.

The impeller is mounted upon a reduced extension 24 of a shaft 25 and is held in position by a nut 26 threaded on the end of the extension. A key 27 embedded in the extension 24 and in the impeller forms an interlocking connection between the two, and at the opposite ends of the bore of the impeller are gaskets 28 to prevent leakage of liquid along the cooperating surfaces of the impeller and the extension 24.

The shaft 25 extends through a stuffing box 29 and through a bearing 30 beyond which it may be connected to a suitable prime mover (not shown). The portion 19 of the shaft lying within the stuffing box is also of smaller diameter than the shaft proper and is encircled by a sleeve 31 which abuts the innermost sealing member 28 and is locked to the shaft by a key 32. The sleeve serves as a renewable bearing surface for the adjacent portion of the shaft and may be conveniently replaced when its surface becomes marred by the packing 33 in the stuffing box.

The packing 33 is of the pliable, compressible type arranged in rings in the stuffing box and a lantern gland 34 is arranged intermediate the ends of the train of packing members to serve its well known function.

The packing 33 is compressed by the usual gland 35 actuated toward the packing by bolts 36 which, in accordance with the practice of the invention, are arranged in slots 37 formed in lugs 38 on diametrically opposite sides of the stuffing box 29. The bolts 36 extend through apertures 39 and are of considerable length so that the gland will be capable of a wide range of movement longitudinally of the shaft without moving out of engagement with the bolts, and on the bolts 36 are long threaded portions 40 to receive nuts 41 which seat against the outer end of the gland for pressing it against the packing.

In order to enable the packing compressing device, namely the gland 35 and the bolts 36, to serve as an instrumentality for removing the impeller 22 from the shaft, a collar 42 is interposed between the sleeve 31 and a shoulder 43 at the juncture of the main body portion of the shaft and the reduced portion 19. In the periphery of the collar 42 is an annular groove 44 to receive a U-shaped washer 45 which, when the gland 35 is retracted from the packing 33, lies in the path of the gland to act as an abutment therefor.

Thus, whenever it is intended to remove the impeller from the shaft and with the washer 45 in position in the groove 44 it is merely necessary to thread down the nuts 41 on the bolts 36. The force thus applied to the gland will be transmitted through the washer 45, the collar 42 and the sleeve 31 to the impeller for forcing it from the extension 24.

After the impeller has been thrust from the shaft the washer 45 is removed from the groove 44 and the gland 35 is then again restored to the packing compressing position shown in Figure 1.

I claim:

1. In combination, a pump having a casing, a shaft therein, an impeller on the shaft, packing for the shaft, a compressor for the packing, and means for transmitting force from the compressor to the impeller for removing the impeller from the shaft including a removable member adapted to be disposed in the path of the compressor to serve as an abutment for the compressor.

2. In combination, a pump having a casing, a shaft therein, an impeller on the shaft, a packing in the casing for the shaft, a compressor for the packing, means encircling the shaft for transmitting force from the compressor to the impeller for removing the impeller from the shaft, and means interlockingly engaging the first said means to form an abutment for the compressor.

3. In combination, a pump having a casing, a shaft therein, an impeller on the shaft, a packing in the casing for the shaft, a compressor for the packing, a sleeve slidable on the shaft abutting the impeller, and a shoulder for the sleeve to engage the compressor for transmitting force from the compressor to the sleeve for removing the impeller from the shaft.

4. In combination, a pump having a casing, a shaft in the casing, an impeller on the shaft, a packing in the casing for the shaft, a compressing device for the packing comprising a gland and bolts for actuating the gland, sleeve means slidable on the shaft abutting the impeller, and means to form an interlocking connection between the gland and the sleeve means to permit the transmission of force from the compressing device to the impeller for removing the impeller from the shaft.

5. In combination, a pump having a casing, a shaft in the casing having an impeller thereon, a packing in the casing for the shaft, a compressing device for the packing comprising a gland and bolts for actuating the gland, sleeve means slidable on the shaft abutting the impeller and having a shoulder, and a U-shaped member to form a connection between the shoulder and the gland and thereby permit the transmission of force from the compressing device to the impeller for removing the impeller from the shaft.

ANTHONY L. McHUGH.